Figure 1:
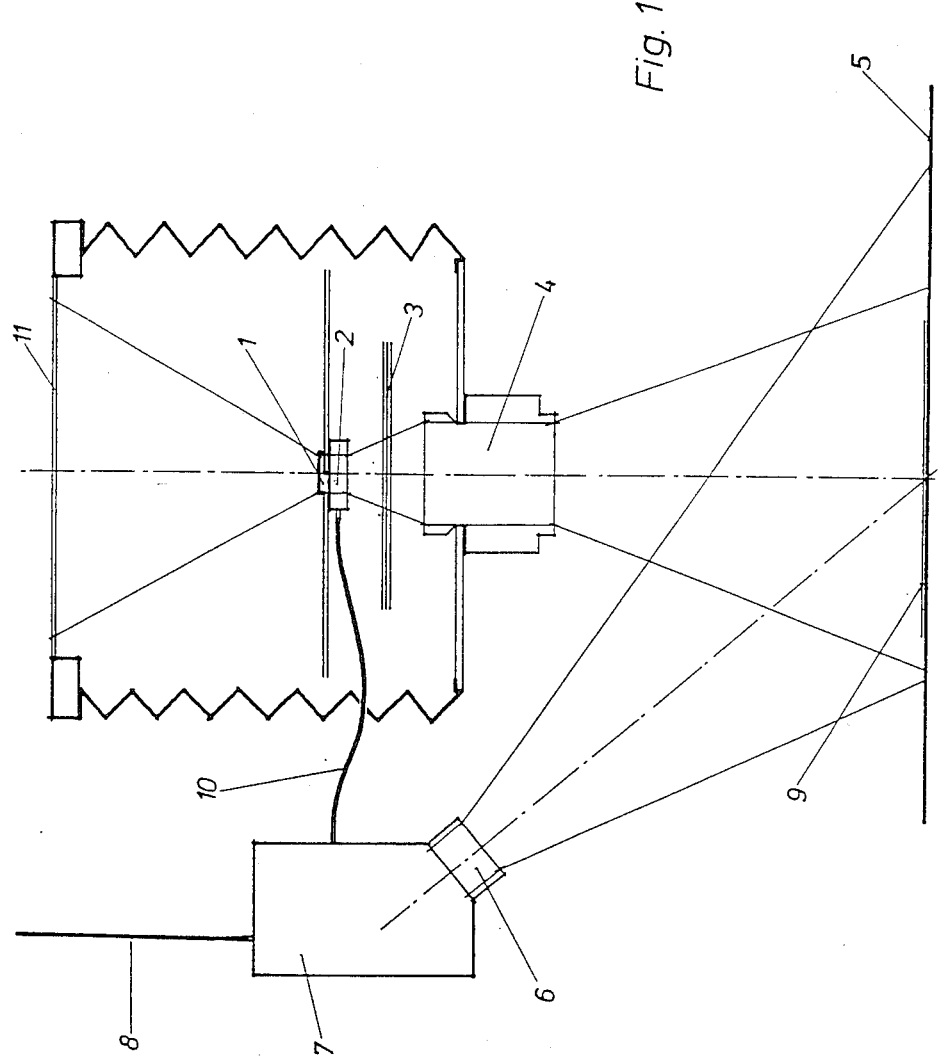

United States Patent [19]

Holm

[11] Patent Number: 4,690,548
[45] Date of Patent: Sep. 1, 1987

[54] METHOD AND APPARATUS FOR THE CONTROL OF A REPRODUCTION CAMERA

[75] Inventor: Niels E. Holm, Soroe, Denmark

[73] Assignee: Danagraf A/S, Soroe, Denmark

[21] Appl. No.: 767,776

[22] Filed: Aug. 20, 1985

[30] Foreign Application Priority Data

Aug. 31, 1984 [DK] Denmark ............................. 4169/84

[51] Int. Cl.$^4$ ............................................. G03B 27/32
[52] U.S. Cl. ......................................... 355/77; 355/68
[58] Field of Search .................................... 355/68, 77

[56] References Cited

U.S. PATENT DOCUMENTS

| | | | |
|---|---|---|---|
| 2,842,025 | 7/1958 | Craig ..................... | 355/68 |
| 2,989,909 | 6/1961 | Reed ...................... | 355/68 |
| 3,117,490 | 1/1964 | Byrd . | |
| 3,704,947 | 12/1972 | Reimann ................. | 355/68 |
| 4,017,180 | 4/1977 | Yen et al. ............... | 355/68 |
| 4,379,632 | 4/1983 | Dedden et al. ......... | 355/68 |
| 4,433,908 | 2/1984 | Omi et al. . | |

FOREIGN PATENT DOCUMENTS 1486972 9/1977 United Kingdom .

Primary Examiner—Monroe H. Hayes
Attorney, Agent, or Firm—Merchant, Gould, Smith, Edell, Welter & Schmidt

[57] ABSTRACT

A reproduction camera comprises a copyboard (5) with picture (9) which is to be photographed, above which is disposed an objective with a diaphragm (4), possible filters (3), a shutter (1) and a focal plane (11) in which the film is placed.

The camera is controlled by an electronic image scanning element (6) which, fully automatically and point by point, scans the copyboard and measures the total light intensity, finds the picture's lightest and darkest points, the picture's position and its dimensions.

A further measuring element (2) measures the light intensity immediately in front of the focal plane.

One can hereby provide a reproduction camera's digital calculation module with all the information necessary for the setting and the control of the exposure, completely without any mechanical movements or manual effort.

4 Claims, 2 Drawing Figures

METHOD AND APPARATUS FOR THE CONTROL OF A REPRODUCTION CAMERA

The invention relates to a method for the control of a reproduction camera.

A reproduction camera usually consists of a copyboard in which the object plane lies, and a focal plane parallel with the object plane, said focal plane lying in a camera housing above the copyboard. The one plane is held stationary, while the other can be moved in the direction of the optical axis of the camera objective, said objective also being movable in the optical axial direction. The focusing adjustment of the camera is effected by manual or motor-driven movement of the movable plane and the objective, usually under control from a digital calculation module which is supplied with information concerning the desired degree of enlargement or reduction, and data concerning the objective. The reproduction camera is also provided with a number of exposure elements, also controlled by the digital calculation module which, among other things, calculates the so-called flash percentage.

In order for the digital calculator to control and set the camera and the exposure elements for the correct exposure, it must have information concerning the original which is to be photographed.

The object of the invention is to provide a method and an apparatus by means of which the reproduction camera's digital calculator is provided with all the information necessary for the setting of the camera and the control of the exposure, completely without mechanical movements or manual effort.

This is achieved by the copyboard and the picture are scanned in such a manner that an electronic circuit with suitable storage facilities has all the necessary information concerning the picture, so that the information which the digital calculator must use for the exposure can be supplied instantaneously from the electronic circuit. It is thus achieved that the photographic exposure with the reproduction camera is carried out by merely placing the picture on the copyboard, bringing the film into the focal plane, entering the basic data concerning the taking of the photograph and then pressing the exposure button. The digital calculator which controls the camera setting and the exposure sequence is then provided automatically with all the necessary information from the electronic scanning element and calculation circuit associated herewith.

One can obtain an instantaneous determination of the picture's lightest and darkest points, plus the position of these points. One is thus able to avoid having to undertake the normal manual scanning of the picture with a densitometer, and hereafter enter Dmin and Dmax into the camera's electronic circuit. A very fast and precise determination of the original's contrast conditions is achieved, because the electronic picture-scanning element has a very large number of photometers, for example in the order of 10–500,000 photometers.

Quite a precise determination of both the size of the original picture and its position on the copyboard is achieved, so that the camera's digital calculator fully-automatically and instantaneously receives this information and calculates, for example, the picture's degree of density, when one has pressed the exposure button.

Correction is obtained for objective, diaphragms and filters, i.e. correction is achieved for all that is placed in the optical path from the original picture to immediately in front of the film. The apparatus can thus instantaneously calculate correction values immediately after one has activated the exposure button, that is in that moment in which the exposure commences. The additional measuring element is naturally placed on or at the shutter in such a manner that it is moved aside when the shutter is opened.

Correction is also obtained for variations during the actual exposure sequence, e.g. variations in the supply voltage. Since the additional measuring element is drawn aside when the shutter is open, in this phase one uses the electronic scanning element to measure the light intensity, and calculate and send correction values to the digital circuit which controls the camera, if changes arise in the lightest point or the overall intensity of light from the picture.

Figure 2:
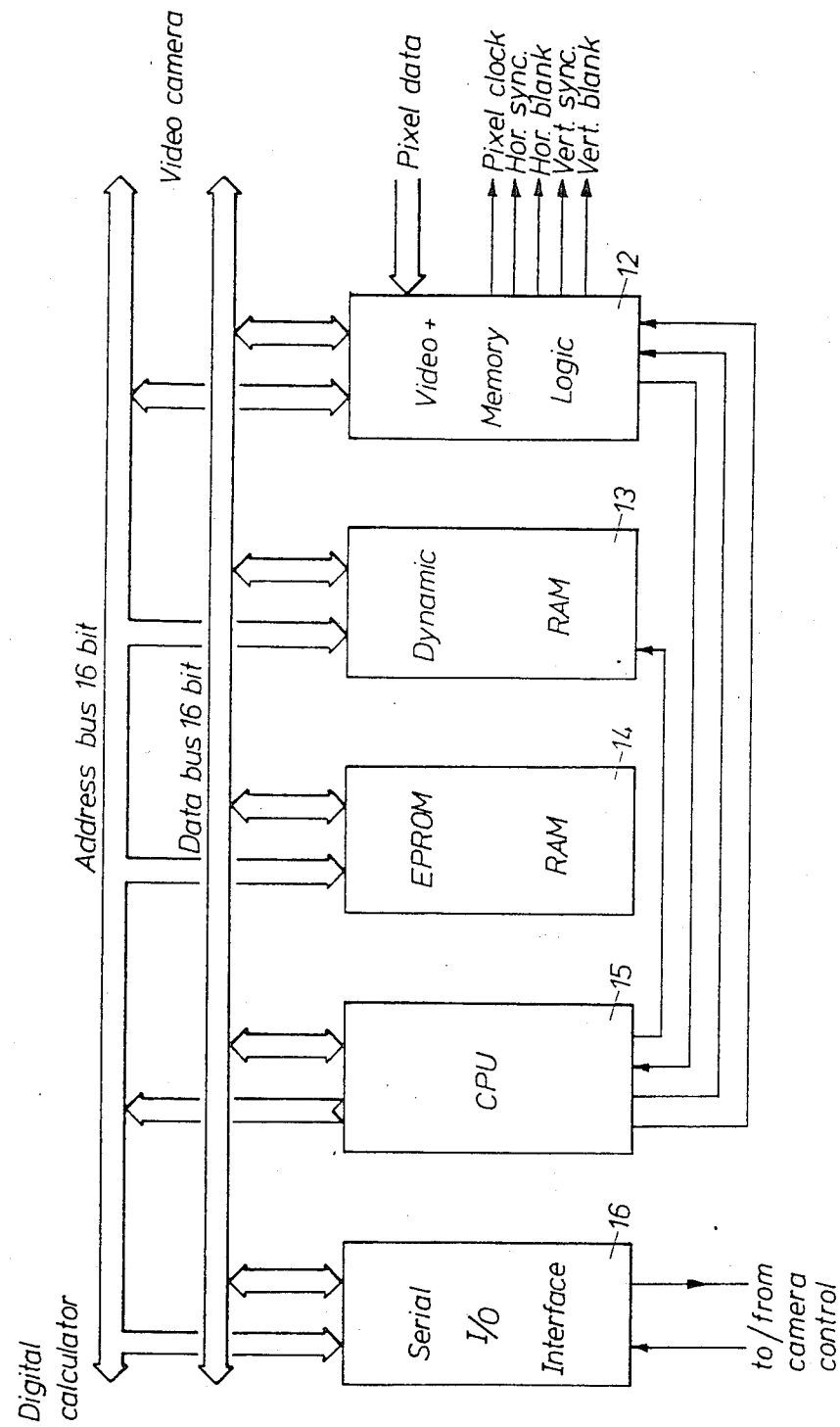

The invention will now be explained in more detail with reference to the drawing, which shows a preferred embodiment of the invention, where FIG. 1 shows a schematic arrangement of the apparatus according to the invention, and FIG. 2 shows a system diagram of the invention's electronic circuit.

In FIG. 1, the reference number 5 indicates a copy board on which, under a coverplate of glass in the normal manner, is placed an original 9 which is to be photographed and transferred to a film lying in a focal plane 11 parallel with the object plane in the copyboard. Disposed between the copyboard 5 and the focal plane 11 are the necessary optics and diaphragm 4 and possible optical filters 3 plus the shutter 1, all in this sequence and together comprising an ordinary reproduction camera.

At the side of the camera is shown a sensor which comprises an electronic picture-scanning element 6 with associated optics (not shown), said scanning element being coupled to an electronic circuit 7. Electronic circuit 7 controls the electronic scanning element 6 and carries out the desired calculations and measurements, and transmits these in digital form through a cable 8 to the digital calculator which controls the camera and thus the exposure.

On the shutter 1, which is shown in the closed position, is placed a sensor 2 which forms a part of an additional measuring element which can measure the light intensity through the objective 4 and the filters 3 from the copyboard 5 with the picture 9, and send the measurement to the circuit 7 through the lead 10. On the basis hereof, the electronic circuit 7 can calculate possible correction values for the basic exposure, said corrections being a function of the specific objective with diaphragm 4 and the filters 3. The correction values are sent on in digital form to the digital calculator which controls the exposure.

The electronic scanning element 6 can be a so-called Solid State Image Sensor which is used in many fields for electronic picture registration or picture recognition. Such elements have a number of punctiform photodiodes arranged in a matrix with rows and columns, for example from 14 to 256 rows and/or columns, i.e. from a few hundred to several thousand photodiodes disposed in quite a small area. Following a certain system, all photodiodes are scanned sequentially, for example by rows, by column or in another manner. Such electronic image sensing elements with associated control circuits can be purchased in the finished state under different type names, for example from the Reticon company in the USA.

By using an apparatus according to the invention, one can, without mechanical movements and fixed mounting on a reproduction camera, carry out the following functions:

A. When a picture 9 has been placed on the copyboard 5 and the exposure has been activated, the following will take place automatically before the exposure is started (i.e. within a period of approx. 3 seconds):

a registration in the electronic control 7 via the scanning element 6 of how the picture 9 is lying on the copyboard 5, and of the picture's dimensions, a sensing with the scanning element 6 of the picture 9, and a registration in the electronic control circuit 7 of the positions of the lightest and the darkest point respectively.

In the electronic circuit 7, a calculation is carried out of the density values Dmin and Dmax for the picture's lightest and darkest point, and a feedback with these values is made to the reproduction camera through the lead 8, a registration in the circuit 7 of the change of light intensity through the objective 4 and the filters 3. The registration is effected via the scanning element 6 and the sensor 2. On the basis of the registration, a correction value is calculated in the circuit 7 for the basic exposures, which is a function of the specific objective with diaphragm 4 and filters 3. Via the lead 8, the correction values are sent to the digital calculator which controls the reproduction camera.

B. During the exposure, the following functions will be carried out:

Via the scanning element 6, a running and continuous monitoring takes place of the picture's lightest point and a measurement of the changes in light intensity, and a hereby continuous feedback to the electronic circuit 7.

The electronic circuit 7 will immediately calculate correction values for the exposure in progress. A feedback of the correction values to the reproduction camera control is effected continuously via the lead 8, and a correction of the exposure is carried out instantaneously.

The correction calculations and the control process will take place continuously during the whole of the exposure sequence, and in step with the receipt of messages concerning changes in the light intensity.

A plate with a density or colour which is between Dmin and Dmax may be used as the copyboard 5, so that the electronic scanning element 6 does not register that Dmin or Dmax lies outside the picture 9.

FIG. 2 of the drawing shows an example of a system diagram of the electronic circuit 7 in FIG. 1, and how this is coupled to the camera's digital calculator. In this case, the picture-scanning element 6 is comprised of a sub-miniature video camera, e.g. the SM72 camera from the company AQUA, Gesellschaft für Industriekameras und Mikroelektronik GmbH, Kempten, Western Germany, said camera having a scanning element with $576 \times 384 = 221,184$ picture dots. The camera functions in accordance with the CCIR norm with 625 lines per picture.

The picture-scanning element 6, in the form of said video camera, is coupled to the right-hand side of the circuit in FIG. 2. The Pixel signals are the electrical signals which come from the punctiform photocells in the video camera's scanning element. The video camera is controlled by the circuit 12, which is a logic circuit arranged for the control of the camera.

The circuit in FIG. 2 also includes a computer 15 which, for example, is of the Zilag Z8001 type, and to which is coupled memories 13 and 14. The memory 13 is of the Dynamic RAM type, for example of 64K, and 14 is a memory of the EPROM type, for example of 16K and with a RAM type memory of 2K.

There is also a circuit 16, this being an Input/Output Serial Interface through which the actual camera control circuit and the sensor 2 are connected to the electronic circuit and the computer 15.

Moreover, the circuit in FIG. 2 is built up in the manner normal for such digital control circuits, and it controls the reproduction camera as discussed under points A and B above.

It will be elementary for those familiar with the art to structure the electronic circuit in many other ways in order to achieve the desired camera functions.

I claim:

1. A method for the control of a reproduction camera, having work surface for receiving a picture comprising the steps of:
   (a) placing the picture on the work surface;
   (b) scanning of the entire work surface including the picture in the object plane on the work surface;
   (c) reading the scanning image optically on a point-by-point basis to determine the intensity of each point by use of a matrix of a large number of punctiformed photometers, converting the photometers into digital values and thereby creating a matrix of numerical measurements;
   (d) analyzing said matrix of numerical measurements to locate the photometers corresponding to the lightest and darkest points, Dmin and Dmax;
   (e) setting the exposure of the camera based on Dmin and Dmax;
   (f) measuring the reflected light from the work surface after the picture is located thereon, calculating the position and dimensions of the picture by use of the image in the matrix; and
   (g) calculating the pictures degree of density and setting the camera according to the measuring under (f).

2. A method according to claim 1 including the steps of measuring the reflected light from the work surface before locating the image thereon, measuring the reflected light from the work surface after the image is located thereon, calculating the position and dimensions of the image within the matrix.

3. A method according to calim 1 including the steps of measuring the light intensity immediately in fromt of a focal plane which is parallel to but spaced from the work surface.

4. A methof according to claim 2 wherein said exposure setting step is continuously performed.

* * * * *